(12) United States Patent
Chen

(10) Patent No.: US 7,492,058 B2
(45) Date of Patent: Feb. 17, 2009

(54) MODULAR UNINTERRUPTIBLE POWER SUPPLY WITH LOADSHARING BETWEEN MODULES

(75) Inventor: Jian Chen, Katy, TX (US)

(73) Assignee: Toshiba International Corp., Houston, TX (US)

( * ) Notice: Subject to any disclaimer, the term of this patent is extended or adjusted under 35 U.S.C. 154(b) by 170 days.

(21) Appl. No.: 11/676,460

(22) Filed: Feb. 19, 2007

(65) Prior Publication Data

US 2008/0158917 A1    Jul. 3, 2008

Related U.S. Application Data

(60) Provisional application No. 60/866,272, filed on Nov. 17, 2006.

(51) Int. Cl.
*H02J 7/00* (2006.01)
*H02J 9/00* (2006.01)
*H02J 3/00* (2006.01)
*G05D 3/12* (2006.01)

(52) U.S. Cl. ............................ 307/64; 307/82; 700/286

(58) Field of Classification Search ............... 307/64, 307/66; 700/286
See application file for complete search history.

(56) References Cited

U.S. PATENT DOCUMENTS

| | | | | |
|---|---|---|---|---|
| 6,292,379 B1 * | 9/2001 | Edevold et al. | .............. | 363/71 |
| 6,396,170 B1 * | 5/2002 | Laufenberg et al. | ........... | 307/64 |
| 6,985,799 B2 * | 1/2006 | Zalesski et al. | ............. | 700/286 |
| 7,265,458 B2 * | 9/2007 | Edelen et al. | ................. | 307/65 |
| 2007/0210652 A1 * | 9/2007 | Tracy et al. | ................... | 307/66 |

* cited by examiner

*Primary Examiner*—Michael J Sherry
*Assistant Examiner*—Michael Rutland Wallis
(74) *Attorney, Agent, or Firm*—Watchstone P+D, pllc; Stephen B. Parker

(57) ABSTRACT

In the preferred embodiments, an uninterruptible power supply has multiple UPS modules connected in parallel. Each module has an AC-DC-AC converter and a subcontroller for controlling the operation of the AC-DC-AC converter. A single current sensor senses a total aggregate current flowing from all the modules. Each subcontroller can detect an input voltage, output voltage, and DC bus voltage of each module. Also, each module has unique operating characteristics (e.g., efficiency curve and a responsiveness coefficient K). Operating characteristics data are stored in a memory accessible by the subcontroller. Based on the voltage and current measurements, and the operating characteristics of each module, the subcontrollers perform calculations to determine a DC bus voltage target (unique for each module) that results in each module providing the same output current. Accordingly, only one current sensor is needed, and, consequently, the cost of the UPS device can be reduced.

14 Claims, 5 Drawing Sheets

Determination of responsiveness coefficient K

Plot of efficiency lookup table data

MODULAR UNINTERRUPTIBLE POWER SUPPLY WITH LOADSHARING BETWEEN MODULES

FIELD OF THE INVENTION

The present invention relates generally to uninterruptible power supplies. More specifically, the preferred embodiments of the present invention relate to an uninterruptible power supply (UPS) having multiple modules connected in parallel, and a method for controlling the modules such that the output current of each module is accurately controlled.

BACKGROUND

Uninterruptible power supplies (UPSs) are commonly used to provide power to critical equipment that must not experience even short duration brownouts or blackouts. For example, computer servers computer networks, telecommunications electronics and medical devices are often powered by an uninterruptible power supply.

A UPS device typically has an AC-DC-AC converter and backup battery that is activated in case the alternating current (AC) line power is temporarily disconnected or falls below a voltage threshold. Some UPS devices have multiple UPS modules (connected in parallel), with each module having an AC-DC-AC converter. Multiple-module UPS devices are commonly used in the information technology (IT) industry.

In multiple-module UPS devices, it is necessary to distribute the load (i.e., output current) equally among the modules. Typically, equal load distribution requires measurement of the output current from each module, and appropriate feedback control of each module. For example, the DC bus voltage of each module can be adjusted so that each module has the same output current. While this method is effective, output current sensors are relatively expensive. Also, each module is subtly different, even when built with nominally identical components. Consequently, each module must be controlled with slightly different feedback gain in order to obtain accurately equal output current.

FIG. 1 shows a conventional multimodule UPS device. Although 3 modules are shown, the device can have 2, 4, or more modules. Modules $10a$ $10b$ $10c$ are identical, but typically have slightly different operating characteristics due to variation in component characteristics (e.g. on resistance or threshold voltage of MOSFET switches). Output current sensors $12a$, $12b$, and $12c$ measure the output current of each module. The output current measurements are used by a main controller 14 to adjust the operation of each module $10a$, $10b$, and $10c$. Typically, the DC bus voltage in each module $10a$, $10b$, and $10c$ is adjusted in order to control the output current from each module $10a$, $10b$, and $10c$.

The output current sensors $12a$, $12b$, and $12c$ are typically Hall effect sensors. A disadvantage of the device of FIG. 1 is that a Hall effect sensor must be provided for every module. Hall effect sensors are relatively expensive, multiple Hall effect sensors significantly increase the cost of the UPS device.

Also, variations in the operating characteristics of each module can complicate efforts to accurately control the output current of each module, and can result in inaccurate output current control.

It would be an advance in the art of UPS devices to provide a multimodule UPS device with control of the output current of each module without requiring a current sensor for each module. Such a UPS device would have a significantly reduced cost and high performance.

Also, it would be an advance in the art to provide a UPS device that can compensate for variations in module characteristics. Compensation of UPS module variations can provide improved current balancing and more accurate output current control.

SUMMARY

The preferred embodiments provide an uninterruptible power supply (UPS) having a plurality of modules connected in parallel. Each module comprises an AC-DC-AC converter having a DC bus voltage, and a subcontroller for performing calculations and controlling the operation of the module.

Preferably, the UPS also has a memory accessible by the subcontrollers. The memory stores data describing the unique operating characteristics of each module (e.g. the coefficient K, and an efficiency curve lockup table). The subcontrollers are able to measure the input voltage, the DC bus voltage, and the output voltage for each module.

Also, an output current sensor is preferably provided for measuring a total aggregate output current provided by all the modules.

In the preferred embodiments, the UPS device also includes instructions stored in memory for performing the following steps:

1) for each module, calculating the input current reference from the DC bus voltage target and the measured DC bus voltage;

2) for each module, adjusting the DC bus voltage towards the DC bus voltage target by controlling AC-DC and/or DC-AC converter using input current reference.

3) for each module, calculating an input current estimate from the coefficient K and the input current reference;

4) for each module, calculating an output current estimate from the input current estimate, an efficiency value from the lookup table, and a measured input voltage;

5) for each module, calculating a DC bus voltage target from the output current estimate and an output current target.

Accordingly, the modules can be controlled to each provide the same amount of output current, without requiring a current sensor for each module. Only a single current sensor is required.

Preferably, each module is nominally identical. In this case, the modules will be made from nominally identical parts, but will have unavoidable operating differences due to part variations and the like.

Preferably, each module provides the same amount of output current.

A main controller can be provided for receiving a total aggregate output current measurement from the output current sensor.

The efficiency lookup table can provide efficiency values as a function of output current.

Steps 1-5 can be repeated at timed intervals.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

DESCRIPTION OF THE FIGURES

The preferred embodiments of the present invention are shown by a way of example, and not limitation, in the accompanying figures, in which.

DETAILED DESCRIPTION

Figure 1:
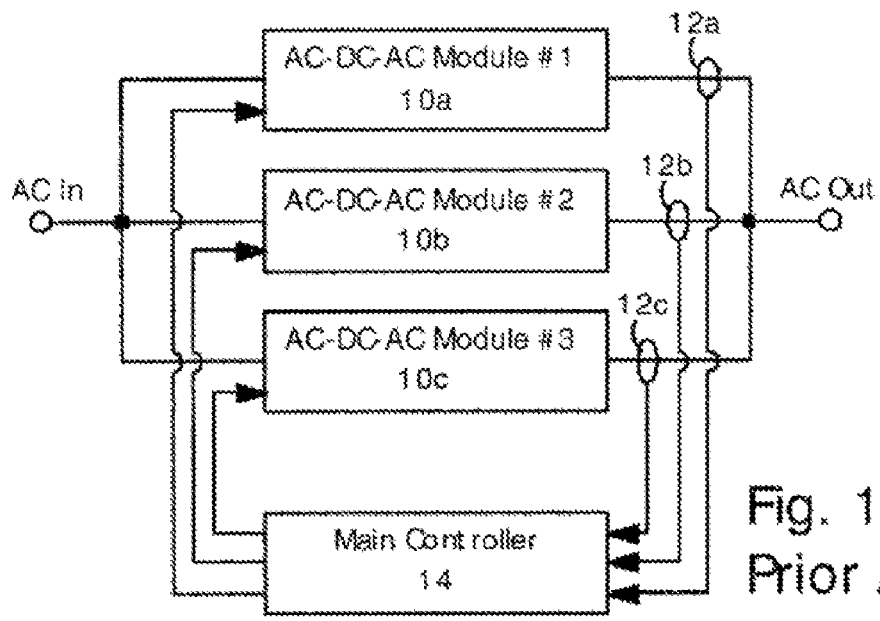
FIG. 1 shows a multiple module uninterruptible power supply (UPS) according to the background art, wherein the UPS device of FIG. 1 has an output current sensor for each module.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

The present invention provides a multimodule UPS device with a plurality of AC-DC-AC modules connected in parallel. Preferably, the modules are nominally identical (however, the modules will be subtly different in operation due to unavoidable part variations). Each module has a subcontroller that is used to perform calculations and control a DC bus voltage in each module. Each subcontroller is in communication with a master controller that facilitates the control of all the modules.

In order to control the present AC-DC-AC modules, several parameters are measured. Specifically, the DC bus voltage, input voltage and output voltage are measured for each module. Also, a total aggregate output current (i.e., a summed current for all the modules) is measured.

Unique operating characteristics are determined (during module fabrication) for each module. Specifically, the power efficiency of each module is determined (as a function of output current) during fabrication and stored in a lookup table. Also, a coefficient K is determined for each module. The coefficient K relates the actual input current of a module to the input current reference signal used to control the module. (The coefficient K describes the responsiveness of each module. The coefficient K can vary between nominally identical modules due to unavoidable part variations).

The modules are controlled so that each module provides the same amount of output current. Specifically, the 4 measured values (DC bus voltage, input voltage, output voltage, and total aggregate output current), and 2 stored values (efficiency, and coefficient K) are used to calculate for each module a DC bus voltage target that will result in each module providing the same amount of output current. Typically, each subcontroller will perform most or all of the control calculations for the corresponding module.

Definitions:

AC-DC-AC Converter: An electronic circuit that receives alternating current power, converts the power to direct current power and then to alternating current power. The voltage of the DC power is known as the DC bus voltage.

Current sensor: any device for sensing current, preferably quantitatively. Hall effect sensors, Rogowski coils, pickup coils, magnetoelectric devices are specific examples of current sensors. The current sensor can be responsive to the time derivative of current (e.g. a Rogowski coil), and be combined with an integrator circuit.

Main controller and subcontroller: Any information-processing device capable of performing mathematical calculations and controlling an external circuit based on the calculations. The controllers can be microprocessors, or application-specific integrated circuits (ASICs) for example.

AC-DC-AC Module: A circuit having an AC-DC converter and a DC-AC converter connected in series. An AC-DC-AC module functions essentially as a UPS.

Input current reference: A desired amount of input current. The input current reference is also a signal applied to each module for controlling its operation by specifying the amount of input current. In the present invention, the input current reference signal is used to control DC bus voltage for a module, as calculated by Equation 1. In other words, the input current reference signal controls the operation of a module by controlling the DC bus voltage.

Input current estimate: A calculated estimate of the instant amount of input current of a module, as calculated by Equation 2.

Output current estimate: A calculated estimate of the instant amount of output current of a module, as calculated by Equation 3.

DC bus voltage target: A desired DC bus voltage that will result in the desired amount of output current for a module, as calculated by Equation 4.

Figure 2:
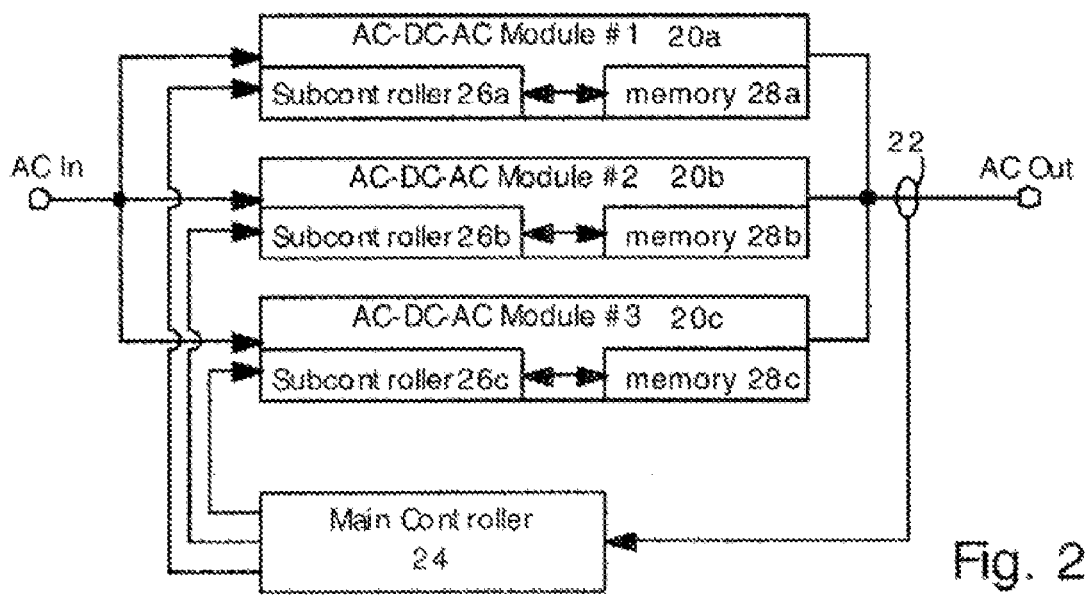
FIG. 2 shows a multiple module UPS device according to some embodiments of the present invention, including a single current sensor senses a total aggregate current output from all the UPS modules 20a, 20b, and 20c.

FIG. 2 shows a multimodule UPS device according to the present invention. The UPS device has three AC-DC-AC modules 20a 20b 20c (hereinafter referred to as "modules") connected in parallel. Each module has a subcontroller 26a 26b 26c. Each subcontroller 26 can comprise a microprocessor or other circuit for performing calculations and controlling the operation of the corresponding module 20. Each module also has a memory 28a 28b 28c. Each memory 28 stores data describing unique operating characteristics of each module. Specifically, each memory 28 stores an efficiency table describing the efficiency versus output current (or output power) for each module. Each module will have a slightly different efficiency curve. Also, each memory 28 stores a coefficient K that describes the responsiveness of each module. The coefficient K is described below.

A current sensor 22 is provided for sensing a total aggregate output current from all the modules. The current sensor is preferably a Hall effect device or other sensor capable of quantitatively measuring output current.

A main controller 24 receives signals from the current sensor 22. The main controller is in communication with each of the subcontrollers. Specifically, the main controller 24 indicates to each subcontroller the amount of output current required by each module 20 (according to Equation 5, described below). The amount of output current required by each module 20 is based on the total aggregate output current sensed by the current sensor 22.

A battery backup power supply (not shown) can be included. The battery backup power supply provides DC bus voltage when the AC input voltage is absent or below a threshold value (i.e., during blackout or brownout conditions).

Figure 3:
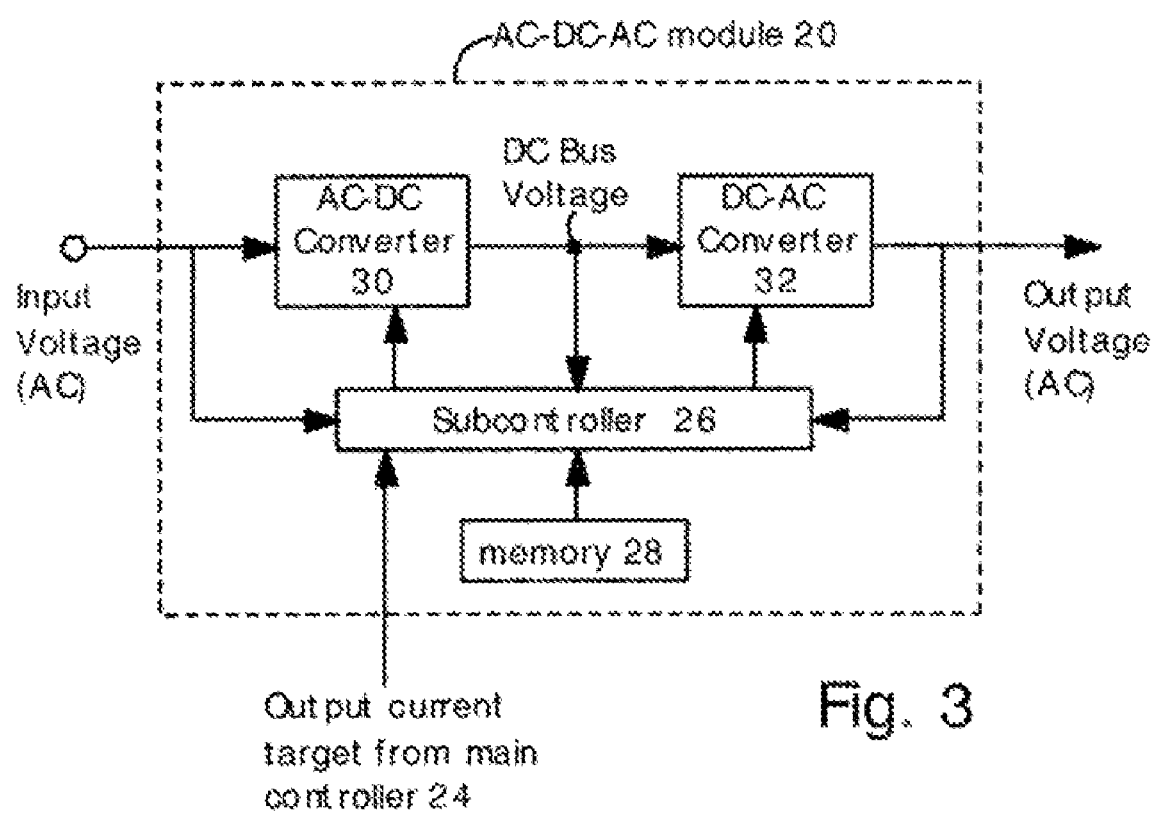
FIG. 3 shows a detailed circuit diagram of a single AC-DC-AC module; preferably, all the AC-DC-AC modules are identical.

FIG. 3 shows a detailed diagram of a module according to an embodiment of the present invention. The module has an AC-DC converter 30 and a DC-AC converter 32 connected in series. The AC-DC converter 30 receives an AC input voltage and produces a DC bus voltage. The DC-AC converter 32 receives the DC bus voltage and produces an AC output voltage. The subcontroller 26 measures or monitors an AC input voltage, the DC bus voltage and the AC output voltage. The module 20 may include voltage measurement circuits or devices (not shown) so that the subcontroller receives a digital representation of the input voltage, bus voltage, and output voltage. The subcontroller 26 controls the operation of the AC-DC converter 30 and/or DC-AC converter 32 (in response to calculations described below) so that the DC bus voltage has a desired value. Typically, the subcontroller controls the AC-DC converter 30 in order to adjust the DC bus voltage to be equal to a desired DC bus voltage target. The subcontroller 26 may or may not control the operation of the DC-AC converter 32.

In an alternative embodiment, the memory 28 is located external to the module 20. In another alternative embodiment, all the memory devices 28a 28b 28c are consolidated in a single memory device external to the modules 20a 20b 20c, but accessible by the subcontrollers 26a 26b 26c.

In the present invention, the subcontrollers 26 control the AC-DC converters (and, optionally, the DC-AC converters) so that each module provides a desired amount of output current. In a preferred embodiment, each module is nominally identical, and each module provides the same amount of output current. Preferably in the invention, the amount of output current provided by each module is controlled by adjusting the DC bus voltage target. Increasing the DC bus voltage target tends to increase the output current, decreasing the DC bus voltage target tends to decrease the output current. The DC bus voltage is controlled by adjusting the input current reference. Increasing the input current reference tends to increase the DC bus voltage; decreasing the input current reference tends to decrease the DC bus voltage. In summary, the DC bus voltage is controlled by input current reference and output current is controlled by DC bus voltage target.

Figure 4A:
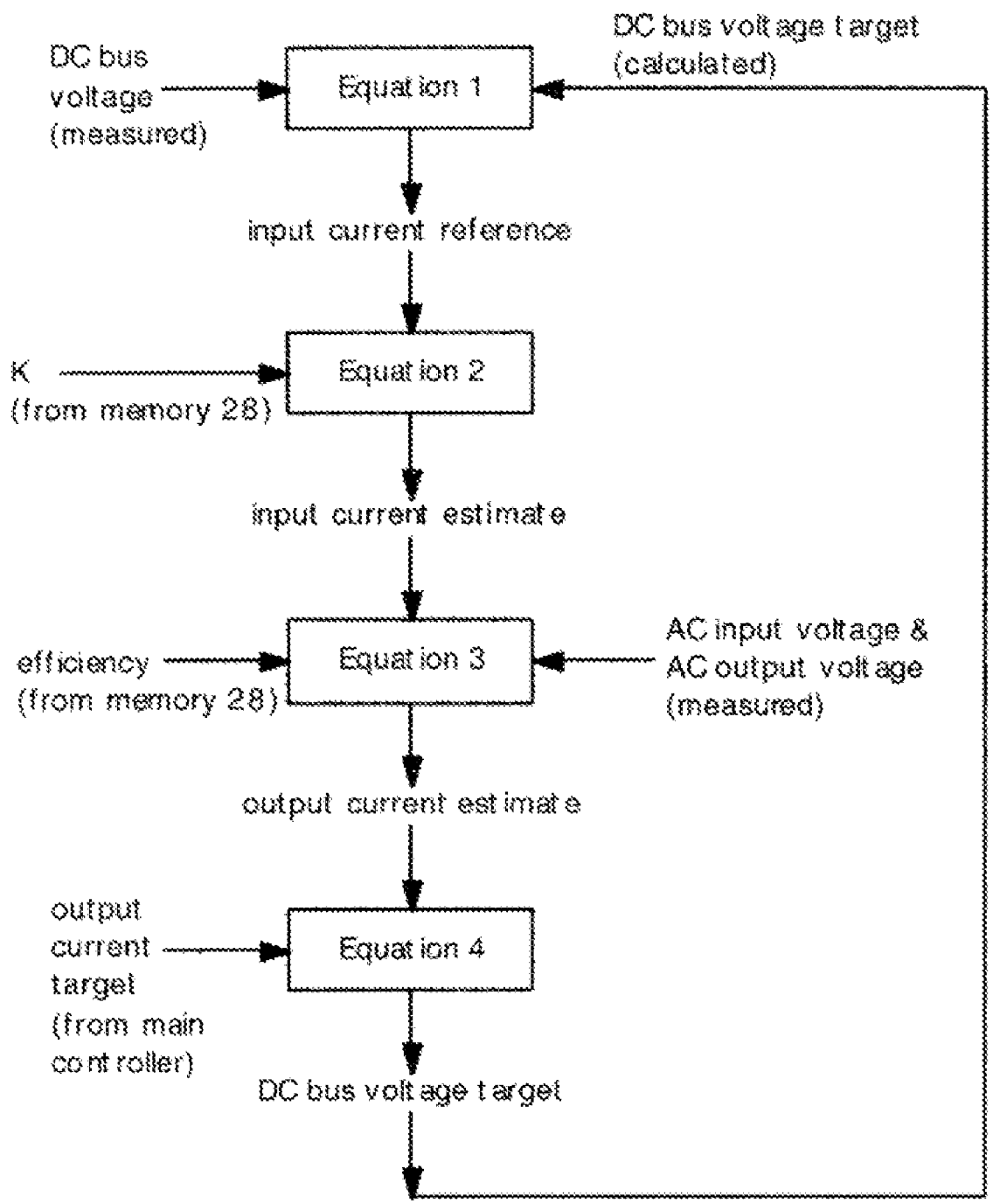
FIG. 4(A) shows a flow chart illustrating preferred embodiments of a method according to the present invention, each box represents a calculation, the calculations may be performed in the subcontrollers, or in the main controller.
Figure 4B:
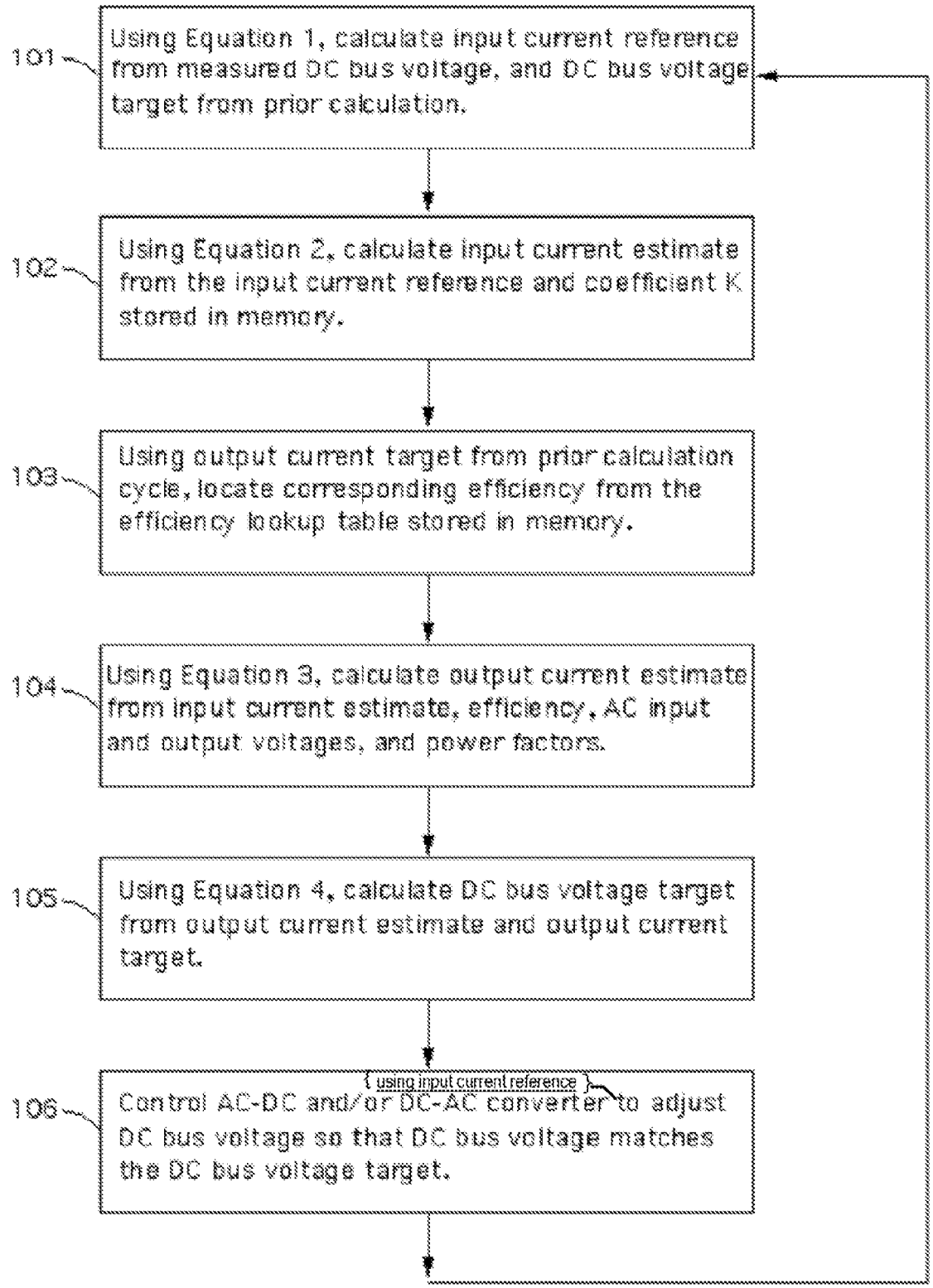
FIG. 4(B) shows a flow chart illustrating a method of the present invention based on the calculations described in reference to FIG. 4(A).

The present invention includes a specific method for controlling the operation of each AC-DC-AC module. The preferred calculation steps are illustrated in FIG. 4A; the preferred method corresponding to the calculations is illustrated in FIG. 4B, and is described below. FIGS. 4A and 4B show one calculation cycle. The calculations in FIGS. 4A and 4B and described below are performed for each module, and will be different for each module. Preferably, each subcontroller 26 performs the following calculations independently of one another. Also, the present calculations are cyclical and reiterated. At every step the calculations rely on values calculated in prior calculation cycles or steps.

Specifically, in a first step 101, an input current reference is calculated. The input current reference indicates a desired level of input current for each module. The input current reference is calculated according to Equation 1, below:

$$\text{Input Current Reference} = A \int_T (BV_{target} - BV) dT + B(BV_{target} - BV).  \quad \text{Equation 1}$$

Where:

T=Time.

$BV_{target}$=DC bus voltage target as calculated in the preceding calculation cycle. $BV_{target}$ is a desired level of DC bus voltage necessary for obtaining the desired amount of output current for a single module. The DC bus voltage target is calculated according to calculations described below. With every calculation cycle, the DC bus voltage target is updated. The $BV_{target}$ is constant over each integration period. Each integration period will typically be equal to the time required for one calculation cycle.

BV=the measured DC bus voltage.

A=Integral gain. High values of integral gain will tend to reduce the amount of steady state offset between the DC bus voltage and DC bus voltage target. In other words, high values of integral gain will tend to result in DC bus voltages that more accurately match the DC bus voltage target in stable operation. High values of integral gain will tend to increase the settling time, however. Hence, selection of the integral gain presents performance tradeoffs between accurate DC bus voltage regulation and settling time.

B=Proportional gain. High values of proportional gain will tend to decrease the rise time (i.e., cause the DC bus voltage to more rapidly rise to the DC bus voltage target). However, excessively high values of proportional gain can also cause undesirable oscillations in the DC bus voltage.

After the input current reference is calculated according to Equation 1, in step 102 an input current estimate is calculated according to Equation 2. The input current estimate is an approximation of the present value of input current.

$$\text{Input Current Estimate} = I_{in} = K(\text{Input Current Reference}) \quad \text{Equation 2.}$$

Where:

K=responsiveness coefficient.

Figure 5:
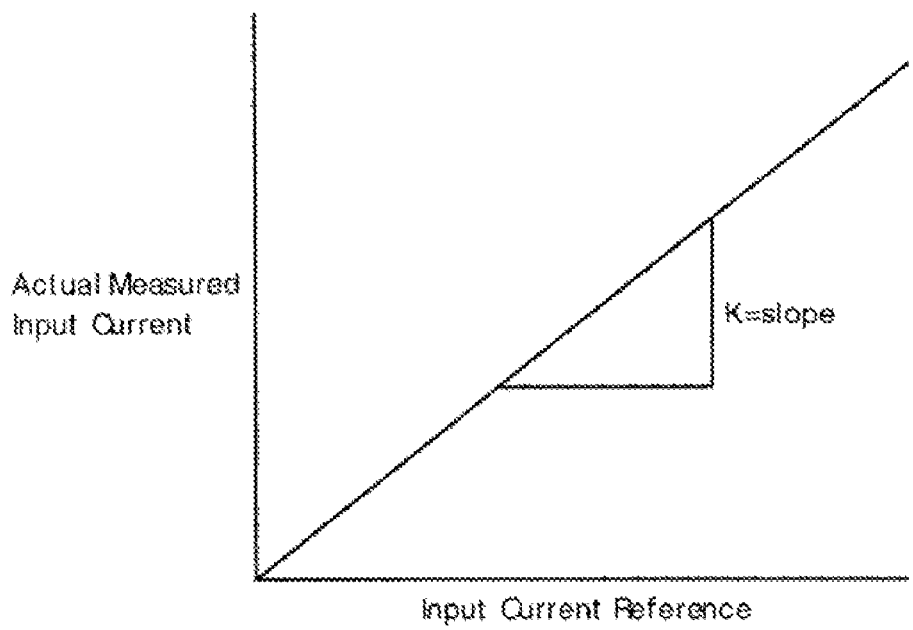
FIG. 5 shows a plot indicating how the responsiveness coefficient K is empirically determined. K is the proportionality constant between an actual measured input current, and an input current reference signal used to control a module.

The coefficient K is an empirically determined coefficient. K is determined at the time a module is manufactured and is unique for each module. The coefficient K is stored in the memory 28 for each module. FIG. 5 illustrates how the coefficient K is determined. Specifically, K is the proportionality constant between the input current reference and an actual measured amount of input current in a module (measured at the time of module manufacture). The coefficient K can be used to calculate the actual input current when the module is operated with a given input current reference signal. Accordingly, the input current estimate is a relatively accurate estimate of the input current. Because the coefficient K is empirically and uniquely determined for each module, the coefficient K compensates for module-to-module operating differences (e.g., due to variations in electronic components).

After the input current estimate is calculated using Equation 2, an output current estimate is calculated in step 104. The output current estimate is an estimate of the output current of a module. Specifically, the output current estimate is calculated according to Equation 3, below:

$$\text{Output Current Estimate} = I_{out} = \frac{E \times V_{in} \times I_{in} \times PF_{in}}{V_{out} \times PF_{out}}. \quad \text{Equation 3}$$

Figure 6:
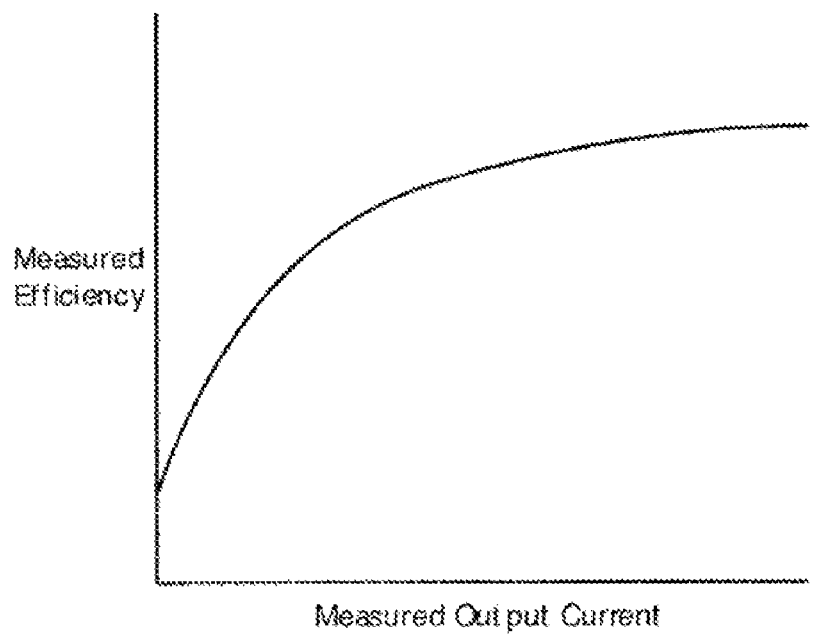
FIG. 6 shows a plot of efficiency lookup table data. Each module has a unique and preferably empirically determined efficiency lookup table.

Where:

E=Module efficiency. The module efficiency is determined in step 103 from a lookup table stored in memory 28. FIG. 6 shows a plot of data from an exemplary efficiency lookup table. The efficiency lookup table is unique for each module, and is generated (at the time the module is manufactured) by determining the module efficiency as a function of measured output current. When an efficiency number is needed for Equation 3, an output current target (described below) is used to find the corresponding efficiency value E from the efficiency lookup table. Each module has a unique and empirically determined efficiency lookup table. Consequently, the efficiency E compensates for module-to-module operating differences (e.g., due to variations in electronic components and the like).

$V_{in}$=The measured input voltage.

$V_{out}$=The measured output voltage.

$I_{in}$=The input current estimate, from Equation 2.

$PF_{in}$=Input power factor. Typically, the input power factor will be 1, because the phase angle between input current and input voltage waveforms is typically zero. Nonunity input power factors are also possible in the present invention.

$PF_{out}$=Output power factor. Typically, the output power factor will be 1, because the phase angle between output current and input voltage waveforms is typically zero. Nonunity output power factors are also possible in the present invention.

Because the output current for each module is calculated, there is no need for each module to have a dedicated current sensor. Consequently, the cost of the present UPS device will be lower than multimodule UPS devices having multiple current sensors.

After the output current estimate is calculated using Equation 3, a DC bus voltage target is calculated in step 105. The DC bus voltage target $BV_{target}$ is the DC bus voltage that will result in the desired amount of output current for a module. The DC bus voltage target will typically be unique for each module, even if each module must provide the same amount of output current. The DC bus voltage target is calculated according to Equation 4 below:

DC Bus Voltage Target =                       Equation 4

$$BV_{target} = C \int_T (I_{target} - I_{out}) dT + D(I_{target} - I_{out}).$$

Where:

T=Time.

$I_{target}$=Output current target. The output current target is a value provided by the main controller 24. The output current target is determined from the total aggregate output current measured by the current sensor 22. Specifically, if the modules are identical, then the output current target is given by:

$$\text{Output Current Target} = \frac{1}{N} \text{ (total aggregate output current)}. \quad \text{Equation 5}$$

Where:

N is the number of modules in the UPS device. To clarify, the output current target is the current each module must provide. If the modules are identical, then the modules will have the same output current target. Preferably, the output current target is calculated by the main controller 24 and provided to the subcontrollers 26 (e.g., as a digital representation).

$I_{out}$=Output current estimate as determined by Equation 3.

C=Integral gain. High values of integral gain will tend to reduce the amount of steady state offset between the output current target and output current estimate. In other words, high values of integral gain will tend to result in an output current that more accurately matches the output current target in stable operation. High values of integral gain will tend to increase the settling time, however. Hence, selection of the integral gain presents performance tradeoffs between accurate output current regulation and settling time.

D=Proportional gain. High values of proportional gain will tend to decrease the rise time (i.e., cause the output current to rapidly rise to the output current target). However, excessively high values of proportional gain can also cause undesirable oscillations in the output current.

The DC bus voltage target is the final variable necessary for properly controlling the module. The DC bus voltage target will generally be different for each module, even under identical operating conditions (e.g. due to unavoidable variations in electronic component characteristics). After the DC bus voltage target is found, the DC bus voltage is adjusted in step 106 by controlling the AC-DC converter 30 and/or DC-AC converter 32 so that the DC bus voltage matches the DC bus voltage target. Adjusting the DC bus voltage to match the DC bus voltage target will cause the output current to match the output current target. The DC bus voltage can be adjusted by controlling the operation of the AC-DC converter 30 (e.g., by adjusting an input current reference signal provided to the AC-DC converter 30).

After each calculation cycle, the DC bus voltage is adjusted, and the calculation is repeated. The measurements, calculations, and DC bus voltage adjustments can be repeated many times per second or minute. Accordingly, the operation of the UPS device is controlled continuously or nearly continuously.

The DC bus voltage can be adjusted by changing the duty cycle or other operating parameters of the AC-DC converter 30. Other ways of changing the DC bus voltage are well known in the art of UPS devices, rectifier circuits and DC-DC converter circuits.

Also, it is noted that all the calculations in the present invention can be combined in a single step designed to determine the DC bus voltage target from all the measured and stored values. Performing discrete and separate calculations in each of the steps illustrated in FIGS. 4A and 4B is optional in the present invention and appended claims.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof etc. In some examples, various embodiments may include overlapping features. In this disclosure, the following abbreviated terminology may be employed, "e.g." which means "for example."

What is claimed is:

1. An uninterruptible power supply (UPS), comprising:
   a) a plurality of modules connected in parallel, wherein each module includes:
      1) an AC-DC-AC converter having a DC bus voltage,
      2) a subcontroller for controlling the AC-DC-AC converter;
   b) a memory readable by the subcontroller, wherein the memory stores a coefficient K that is unique for each module, and wherein the memory stores an efficiency lookup table that is unique for each module;
   c) a voltage measurement device or devices for measuring in each module: a DC bus voltage; an output voltage, and an input voltage;
   d) an output current sensor for measuring a total aggregate output current from all the modules;
   e) instructions stored in the memory for instructing the subcontroller to perform the following steps:
      1) for each module, calculating an input current reference from a DC bus voltage target and the measured DC bus voltage;
      2) for each module, calculating an input current estimate from the coefficient K and the input current reference;
      3) for each module, calculating an output current estimate from the input current estimate, an efficiency value from the lookup table, a measured input voltage and a measured output voltage;
      4) for each module, calculating a new DC bus voltage target from the output current estimate and an output current target,
      5) for each module, adjusting the AC-DC-AC converter using input current reference so that the DC bus voltage changes towards the new DC bus voltage target.

2. The uninterruptible power supply (UPS) of claim 1, wherein each module is nominally identical.

3. The uninterruptible power supply (UPS) of claim 2, wherein the output current target is equal to $$\frac{1}{N}(\text{Total Aggregate Output Current}),$$

where N is the number of modules.

4. The uninterruptible power supply (UPS) of claim 3, further comprising a main controller receiving a total aggregate output current measurement from the output current sensor, wherein the main controller is in communication with each subcontroller, and wherein the main controller calculates the output current target and provides the output current target to each subcontroller.

5. The uninterruptible power supply (UPS) of claim 1, further comprising a main controller receiving a total aggregate output current measurement from the output current sensor wherein the main controller is in communication with each subcontroller.

6. The uninterruptible power supply (UPS) of claim 1, wherein each module includes a computer-readable memory in communication with a corresponding subcontroller.

7. The uninterruptible power supply (UPS) of claim 1, wherein the efficiency lookup table provides efficiency values as a function of output current.

8. The uninterruptible power supply (UPS) of claim 1, wherein the computer-readable memory further including instructions for repeating steps 1-5 at timed intervals.

9. The uninterruptible power supply (UPS) of claim 1, wherein the DC bus voltage in each module is changed by adjusting an input current reference signal provided to each module.

10. The uninterruptible power supply (UPS) of claim 1, wherein the input current reference calculation is in the form:

$$\text{Input Current Reference} = A \int_T (BV_{target} - BV) dT + B(BV_{target} - BV)$$

where A and B are integral and proportional gain constants.

11. The uninterruptible power supply (UPS) of claim 1 wherein the DC bus voltage target calculation is in the form:

DC Bus Voltage Target =

$$BV_{target} = C \int_T (I_{target} - I_{out}) dT + D(I_{target} - I_{out})$$

where C and D are integral and proportional gain constants.

12. An uninterruptible power supply (UPS), comprising:
    a) a plurality of nominally identical modules connected in parallel, wherein each module includes:
       1) an AC-DC-AC converter having a DC bus voltage,
       2) a subcontroller for controlling the AC-DC-AC converter;
    b) a memory readable by the subcontroller, wherein the memory stores a coefficient K that is unique for each module, and wherein the memory stores an efficiency lookup table that is unique for each module;
    c) a voltage measurement device or devices for measuring in each module: a DC bus voltage, an AC output voltage, and an AC input voltage;
    d) an output current sensor for measuring a total aggregate output current from all the modules, wherein an output current target for each module is determined from the total aggregate output current; and
    e) instructions stored in the memory for instructing the subcontroller to calculate a DC bus voltage target for each module, wherein the DC bus voltage target is calculated from the measured DC bus voltage, a prior DC bus voltage target, the coefficient K, an efficiency value from the lookup table, the AC output voltage, the AC input voltage, and the output current target;
       wherein the DC bus voltage target is selected such that when each module has a DC bus voltage equal to its DC bus voltage target, each module provides an approximately equal amount of output current.

13. The uninterruptible power supply (UPS) of claim 11, wherein the instructions in element (e) include instructions for performing the following steps:
    1) for each module, calculating an input current reference from the DC bus voltage target and the measured DC bus voltage;

2) for each module, calculating an input current estimate from the coefficient K and the input current reference;

3) for each module, calculating an output current estimate from the input current estimate, an efficiency value from the lookup table, a measured input voltage and a measured output voltage;

4) for each module, calculating a DC bus voltage target from the output current estimate and an output current target.

5) for each module, adjusting the AC-DC-AC converter using input current reference so that the DC bus voltage changes towards the DC bus voltage target;

6) repeating steps 1-5 a plurality of times.

14. A method for calculating a new DC bus voltage target for each module in a multimodule UPS device, wherein each module has a unique coefficient K, and a unique efficiency lookup table, wherein the efficiency lookup table provides efficiency values for a range of output currents, the method comprising the steps of:

1) measuring an input voltage, and output voltage, and a DC bus voltage for each module;

2) for each module, calculating the input current reference from a prior DC bus voltage target and the measured DC bus voltage;

3) for each module, calculating an input current estimate from the coefficient K and the input current reference;

4) for each module, calculating an output current estimate from the input current estimate, an efficiency value from the lookup table, and a measured input voltage and a measured output voltage, and 5) for each module, calculating the new DC bus voltage target from the output current estimate and an output current target.

* * * * *